Feb. 16, 1971   B. S. DEW   3,564,539
DIGITAL RESOLVER
Filed March 27, 1969   5 Sheets-Sheet 1

INVENTOR.
BROCK S. DEW

United States Patent Office 3,564,539
Patented Feb. 16, 1971

3,564,539
DIGITAL RESOLVER
Brock S. Dew, Watertown, Mass., assignor, by mesne assignments, to the United States of America as represented by the Secretary of the Navy
Filed Mar. 27, 1969, Ser. No. 811,046
Int. Cl. H03k 13/14
U.S. Cl. 340—347                                    9 Claims

ABSTRACT OF THE DISCLOSURE

A digital resolver is disclosed which rotates an input vector from a shaft angle transmitter in accordance with the number in a binary counter to achieve a null. The rotation is performed in three stages, two of which provide for large, exact, discrete rotations and the third for a linear approximation. When a null is achieved, the angle through which the input vector has been rotated represents the angular position of the transmitter shaft. The resolver may be used either to control the angular position of the shaft or to read out the shaft angle of the transmitter as a binary number.

---

The invention described herein may be manufactured and used by or for the Government of the United States of America for governmental purposes without the payment of any royalties thereon or therefor.

This invention relates to resolvers for accurately measuring and encoding the angular positions of rotating shafts and, more particularly, to an improved digital resolver which produces a digital representation of the shaft angle.

The resolution of a purely electronic digital resolver is generally determined by the number of discrete angular rotations that can be imparted by the resolver to the incoming shaft angle vector. In the present invention, these rotations are generated both by changing the polarity of orthogonal vectors making up the incoming vector and by interacting these two vectors to form a resultant vector. The process of interaction of the vectors is referred to herein as crosscoupling.

In the general operation of the subject digital resolver, its counter, which controls the angular rotation of the resolver, is initially set to some arbitrary digital angle. This digital angle is converted by the resolver into an analog angle which is subtracted from the incoming analog angle. If the result of this subtraction is nonzero, the arbitrary angle in the counter is made to change until it coincides with the shaft angle as indicated by a zero or null result. At this time the angle in the counter is read out in digital form.

One way of understanding the operation of this resolver is to consider the angle provided by this counter as converted into an analog angle having components in the above-mentioned orthogonal directions. This analog angle rotates the incoming analog shaft angle vector towards zero degrees by subtracting its components from those of the incoming vector. If the rotation is insufficient to reduce the incoming shaft angle to zero or if it causes the vector to rotate past zero degrees into the negative region, the counter is made to either advance or retreat until a zero degree or null result is achieved. At this point in time, the counter has rotated the incoming shaft angle vector by precisely the negative of its angle. The absolute value of the angle used to rotate the incoming shaft angle vector to zero degrees may then be read out in digital form.

In order to produce this null result, the digital resolver takes the counter information and alters the input voltages across certain resistive elements in the resolver networks. These resistive elements rotate the incoming analog vector by attenuating its components. If the polarity and the crosscoupling of the voltages applied across these networks are changed, the resistive elements will attenuate different components and thus produce as many rotations of the input vector as there are changes in voltage. It will be appreciated that changing the polarity of a voltage across a resistive network is one way to provide two different voltages across it. Likewise, if there are two possible input signals, switching them alternately across the resistive network also provides two further separate voltages. If the input to the resolver is $E \sin \theta$ and $E \cos \theta$, changing the polarity of one of these signals and switching it to one resistive network provides for two possible voltages to be applied across the resistive elements in the network, i.e., either the original signal or its reversed counterpart. If the other signal is switched to this network, this one resistive network may have one of two signals applied across it each having a polarity-reversed and nonreversed counterpart. This results in four possible voltages being applied across the resistive network and thus in four rotations that can be obtained.

The rotations generated by this combined process of polarity shifting and crosscoupling are called discrete rotations. If the actual shaft angle lies between any two discrete rotations, interpolation is necessary to achieve the above null.

One of the major problems in any method of digitally resolving the angle of a shaft is providing this digital resolver with the ability to produce a large number of discrete rotations so that the above nulling can occur. The greater the number of discrete rotations, the less the amount of interpolation necessary to produce a null and the less critical the method of interpolation between the discrete angles.

The present invention increases the number of discrete rotations available while at the same time decreasing the number of components necessary to carry out the rotation by utilizing all of the resistive elements of the resolver in every rotation. In each rotation it is a crosscoupling of the polarity-shifted and nonshifted components of the incoming vector which produces the resultant rotation. Because the input vector components are polarity shifted and crosscoupled simultaneously, the resolver produces the required discrete rotations with a minimum number of components.

In producing these rotations, two unique switching arrangements are used with a hybrid resolver network and a feedback resolver network to achieve a 25.0 arc sec. theoretical accuracy in a five-bit system. The number of discrete rotations produced by this hybrid network is quadrupled without the need for an additional set of buffers or additional three-bit logic stages by utilizing an additional two-bit logic stage to control an equivalent of the hybrid resolver network mentioned above. This equivalent circuit, referred to herein as the feedback resolver network, produces by means of feedback signals a rotation of the incoming vector to any one of four discrete angles prior to its rotation by the hybrid network, thus quadrupling the number of discrete rotations. The digital resolver is thus made to follow the analog signal produced by the shaft angle transmitter with greater accuracy than heretofore possible in a five-bit system.

It is therefore an object of this invention to provide a digital resolver having increased resolution by prerotating the input vector by discrete amounts prior to its rotation by resolver network so as to increase the number of discrete angles which can be generated by the resolver.

It is a further object of this invention to employ a feedback resolver network to prerotate the input signal to a resolver so as to increase the number of discrete rotations generated by the feedback-hybrid resolver combination.

It is another object of this invention to provide a unique switching arrangement for polarity-reversing and cross-coupling the inputs to the several sections of a digital resolver.

Other objects, advantages and novel features of the invention will become apparent from the following detailed description thereof when considered in conjunction with the accompanying drawings in which like numerals represent like parts throughout and wherein.

Figure 2:
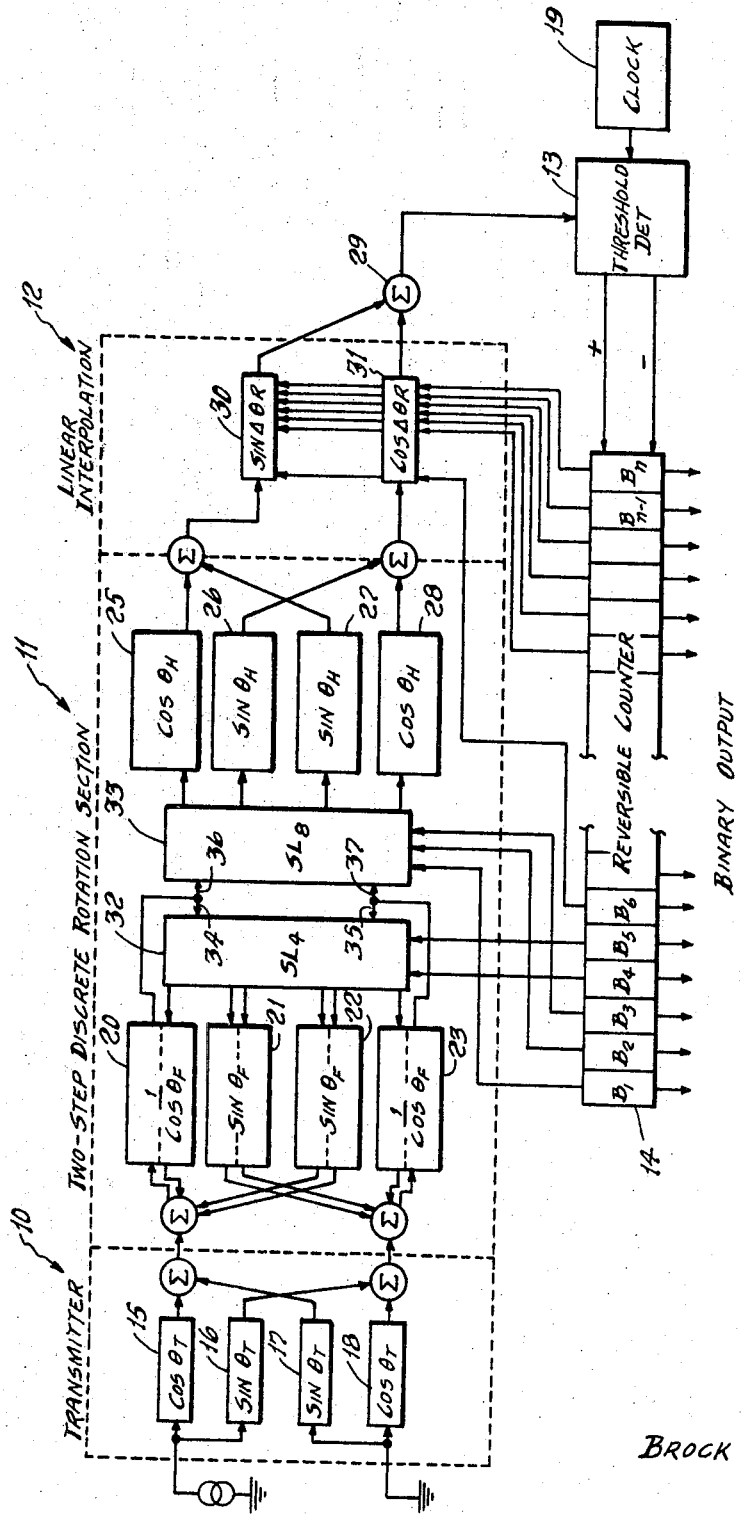
FIG. 2 is a more detailed block diagram of a digital resolver showing electronic equivalents of the shaft angle transmitter of FIG. 1, a discrete rotation network and a linear interpolation circuit.
Figure 5:
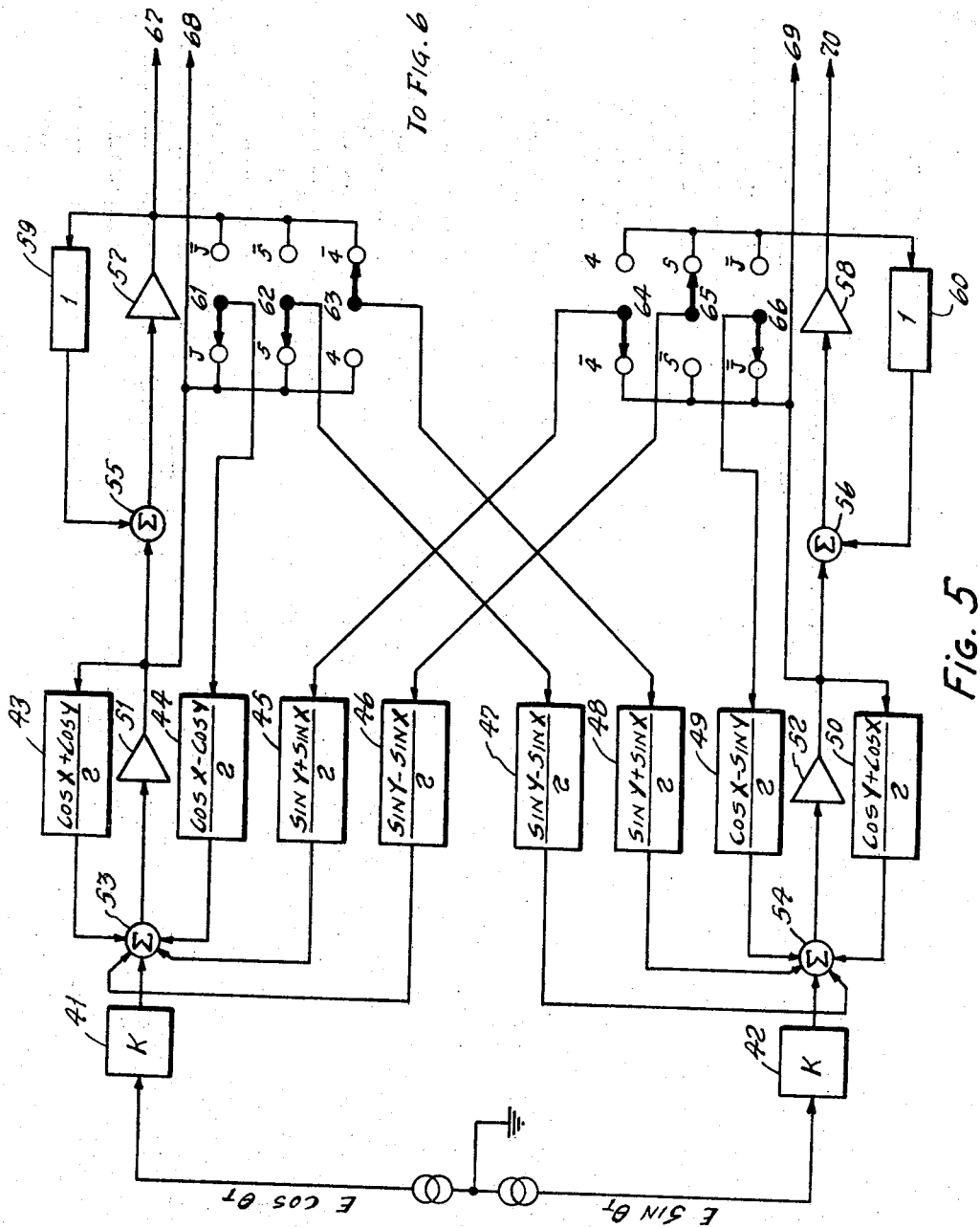
Figure 6:
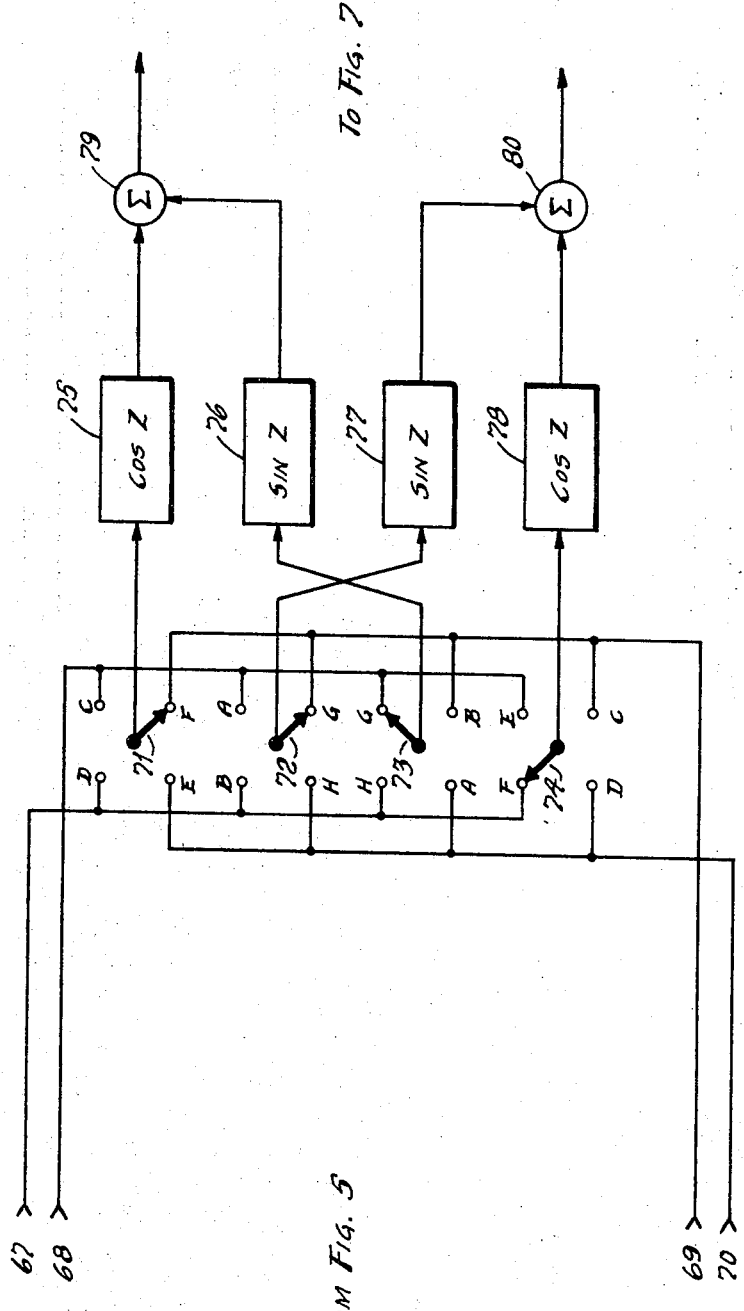
Figure 7:
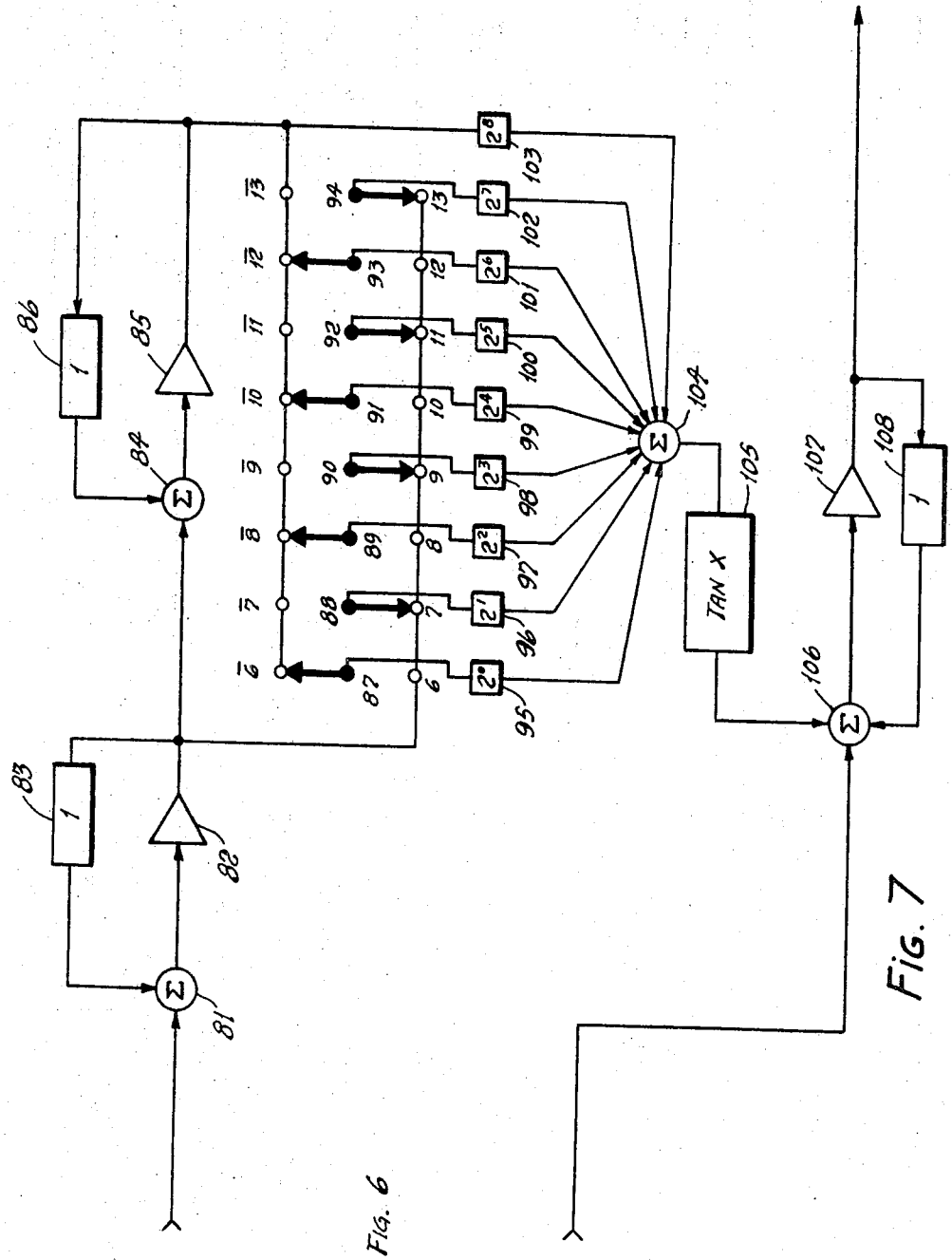

FIGS. 5, 6 and 7 together represent a schematic diagram of one embodiment of the resolver shown in FIG. 2.

Figure 1:
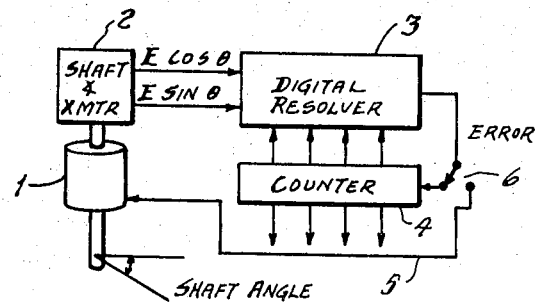
FIG. 1 is a diagram of the components of an electronic digital resolver showing a shaft and shaft servo, a shaft angle generator and a counter connected to the resolver.

Referring to FIG. 1, a shaft and shaft servo 1 are shown connected to a shaft angle transmitter 2 which has an output corresponding to the angle of the shaft. This output is in the form of two voltages, $E \cos \theta$ and $E \sin \theta$, which define the two components of the incoming shaft angle vector. These two voltages drive a digital resolver 3 which rotates the shaft angle vector represented by these two voltages. This rotation is controlled by a binary counter 4. If the resolver does not rotate the incoming vector to zero, it produces an error signal which causes the counter either to advance or retreat until the error is reduced to zero. At this time the counter reads the shaft angle.

This error signal may alternately be used as an analog feedback signal when it is connected by switch 6 to shaft servo 1. This feedback is shown by line 5. When switch 6 connects the error signal to the shaft servo, a nonzero error signal may power the shaft servo until the angle of the shaft is equal to the angle set in the resolver by the counter. In this mode of operation, the digital resolver serves to set the angular position of the shaft.

Another application of the subject resolver is in a successive approximation system. When only short intervals of time are available for resolution, the counter is fed with trial angles. If the trial angle is not within a certain accuracy as indicated by a nonzero error signal, other angles are successively tried. The trials are made one bit at a time starting with the most significant bit. The subject resolver is also capable of generating a sinusoidal function in the form of an error signal. This function will have a predetermined relation to the shaft angle signal and can be varied by varying the angle in the counter.

FIG. 2 is an expanded block diagram of FIG. 1 showing the shaft angle transmitter encompassed in dotted box 10. The discrete rotation section of the digital resolver is shown in dotted box 11 and the linear interpolation section of the digital resolver in dotted box 12. Also shown is a threshold detector 13 which converts the above-mentioned analog error signal into digital form to be used by reversible counter 14. This counter has an "n" bit capacity and controls the polarity and cross-coupling of the signal in the discrete rotation and interpolation sections of the resolver. The counter is made to change by signals transmitted from the threshold detector. This detector is gated by clock 19 so that it samples only a portion of the analog error signal. If the sampled portion of the error signal is above a threshold, a positive pulse is generated by the detector and transmitted to counter 14. If it is below this threshold, a negative pulse is transmitted. In this way, a series of pulses are transmitted to the counter to advance or retreat the count in the counter by a fixed amount according to the sign of the error.

More advanced counter advance devices may sense not only the sign of the error, but also its magnitude. These devices are then made to advance or retreat the count in the counter by a decreasing series of amounts as the magnitude of the error diminishes.

The last five bits of counter 14 ($B_1$, $B_2$, $B_3$, $B_4$ and $B_5$) control the amount of discrete rotation given to the incoming vector. The remaining bits ($B_6 \ldots B_n$) control the linear interpolation of the resolver.

Transmitter 10 is characterized by four elements in a resolver network configuration. In one arm of the network are elements 15 and 16 having transfer functions representing the cosine and sine of the shaft angle. The other arm of the network also contains two elements, 17 and 18 which have transfer functions representing the sine and cosine of the shaft angle, respectively. The output of this network is in the form of two signals, represented by the above-mentioned signals, $E \cos \theta$ and $E \sin \theta$. These components characterize the shaft angle in analog terms as input vector $\overline{V}$.

Figure 3:
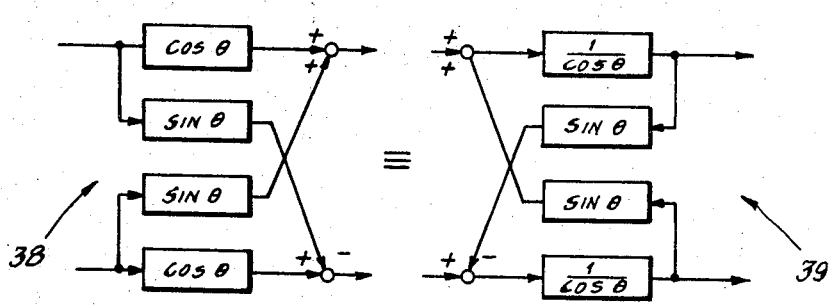
FIG. 3 is a diagram showing the equivalence of the hybrid resolver network and the feedback resolver network shown in FIG. 2.

In the two step discrete rotation section 11, this input vector is prerotated by a set of elements 20, 21, 22 and 23, having transfer functions $$\sin \theta_F, \sin \theta_F \text{ and } \frac{1}{\cos \theta_F}$$

$$\frac{1}{\cos \theta_F}$$

respectively, where $\theta_F$ is constant. These elements constitute the aforementioned feedback resolver network. The amount of discrete rotation imparted to the input vector, $\overline{V}$, is controlled by bits $B_4$ and $B_5$ in counter 14. These bits switch different voltages through elements 20 through 23 of this network. These different voltages are supplied by switching logic 32 which reverses the polarity of the feedback signals at 34 and 35 in four separate ways in response to signals from the above two bits in the counter. There are four possible switching patterns for the switching logic. The manner of generating these four voltages will be described in greater detail in FIG. 5. In essence, however, the two feedback signals at 34 and 35 may each be polarity-reversed or not to yield a set of voltages having polarities $++$, $+-$, $-+$ and $--$. This provides the network composed of elements 20 through 23 with four separate voltages which are crosscoupled by the network to produce four separate rotations. The rotation imparted by this feedback network is analogous to the rotation of the hybrid resolver network shown by elements 25, 26, 27 and 28 having transfer functions $\cos \theta_H$, $\sin \theta_H$, $\sin \theta_H$ and $\cos \theta_H$, respectively, where $\theta_H$, is constant. The equivalence of these two networks is shown diagrammatically in FIG. 3 where network 38 is shown to be the equivalent of network 39. This equivalence is further discussed in connection with FIG. 5.

The input to the hybrid resolver is the two-channel output of the feedback resolver network shown at 36 and 37. This output is modified in two ways by switching logic 33. As in the feedback case, the input to the hybrid resolver is polarity-shifted by the switching logic to provide four discrete rotations. Simultaneous with the polarity shifting, the two channels of the output from the feedback resolver may be reversed by the switching logic. This channel reversing provides two more possibilities for an input, i.e., either reversed or unreversed channels of the output of the feedback resolver. The hybrid resolver is thus capable of two times four separate voltages or eight discrete rotations. Switching logic 33 will be described in greater detail in FIG. 6.

The number of discrete rotations thus obtainable with the feedback hybrid resolver combination is eight times four or 32 discrete rotations. The resolver thus has a resolution of 11¼ degrees in its discrete rotation section.

Further resolution is obtained by linear interpolation section 12. The linear interpolator is composed of two elements 30 and 31 having transfer functions sin $\Delta\theta_R$ and cos $\Delta\theta_R$. These elements may be further subdivided by fabricating them with a multiplicity of resistive elements. In one embodiment shown in FIG. 7, if the inputs to each of eight resistive elements are alternately provided with a polarity-reversed or a nonpolarity-reversed signal from the output of the hybride resolver network, the degree of resolution of the resolver may be brought to within 25.0 arc seconds. That is, there will be 512 total possible rotations with a 13 bit counter if the polarity of the input of these eight resistive elements is controlled by eight bits of the counter.

The particular values of $\theta_F$, $\theta_H$ and $\theta_R$ are constant. If the elements designated by 20 through 23, 25 through 28 and 30 through 31 are resistors, the value of each resistor will be $kf(\theta)$ where $\theta$ is constant, $k$ is any reference resistance and $f$ is the particular function for the particular resolver element whose resistance is to be determined. In the case of elements 30 and 31, the $\Delta\theta_R$ refers to the sum of the resistances of the subdivided elements.

The feedback resolver network is basically a feedback network equivalent to the hybrid network configuration. Its use in the present resolver reduces the number of amplifiers necessary to achieve the requisite number of discrete rotations by utilizing only one set of amplifiers to serve the three functions of input buffering, switching logic 32 buffering and switching logic 33 buffering. It should be noted that this feedback network need only be controlled by two bits of counter information as compared with the three bits necessary in the hybrid case. While these two bits produce only four discrete rotations, as opposed to eight with the three bit system, only four more discrete rotations are necessary to achieve the desired accuracy. In mobile applications such as in ballistic missiles where counter space is at a premium and where weight reduction is desirable, a resolver incorporating the above feedback and hybrid networks may be used to advantage.

In summary, an incoming signal after rotation by the feedback network is again rotated by the hybrid network. The result of the rotation is then transmitted to the linear interpolation section of the resolver. If the rotation imparted by the feedback and hybrid networks does not rotate the incoming vector to zero, an analog error signal is produced at 29. This signal after conversion resets the counter which changes the voltages present at the inputs to the networks. As the count in the counter builds up, the linear interpolator successively changes the polarities of the voltages impressed on each of its subelements until error is within a predetermined small range. The linear interpolator is continually running through all of its possible states as the counts proceed through the counter to the most significant bit. Thus, for every change in bits $B_1$, $B_2$, $B_3$, $B_4$ and $B_5$ of the counter, the linear interpolator will have run through all of its possible states. It will be appreciated that after a number of counter resetting operations, the error will go from positive to negative with each cyclic change.

Figure 4:
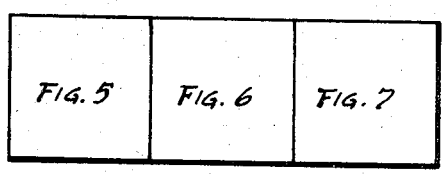
FIG. 4 is a block diagram showing the interrelation of FIGS. 5, 6 and 7.

FIG. 4 shows the relationship between FIGS. 5, 6 and 7. FIGS. 5, 6 and 7 together describe one possible embodiment of the invention. FIG. 5 describes one embodiment of the feedback network in discrete rotation section 10 of FIG. 2. FIG. 6 describes one embodiment of the hybrid network of this section. FIG. 7 is one embodiment of linear interpolation section 12 of FIG. 2.

Referring now to FIG. 5, a shaft angle signal is shown entering this section of the resolver. This signal represents a vector having two components, $E \cos \theta$ and $E \sin \theta$. These two components are attenuated by constants 41 and 42 before entering the discrete rotation portion of the resolver at summation devices 53 and 54. The discrete rotation portion of the resolver is composed of two networks, the first of which is shown in FIG. 5. Both of these networks have transfer functions represented, respectively, by elements 20 through 23 and 25 through 28 of FIG. 2. The first network, including its amplifier and buffer stages, corresponds to the feedback equivalent of the hybrid network 25 through 28 shown in FIG. 2. From FIG. 2 it will be seen that network elements 20 through 23 have the transfer functions noted in network 39 of FIG. 3. It will be noted that there are six inputs and two outputs on the right-hand side of elements 20 through 23. The number of inputs and outputs can be reduced so as to correspond to the inputs and outputs on the right-hand side of network 39 by merely using tangent functions. They are not reduced so that the correspondence between network elements 20 through 23 and network elements 43 through 50 can be shown. Likewise, the inputs and outputs of the left-hand side of network 20 through 23 could be reduced to correspond to the inputs and outputs on the left side of network 39. Elements 20 through 23 are shown having a dotted line through each box to indicate that these elements may be further subdivided. These subdivisions are shown by elements 43 through 50 in FIG. 5. The net transfer functions of elements 43 and 44 is $$\frac{1}{\cos \theta_F}$$

of elements 45 and 46 is sin $\theta_F$; of elements 47 and 48 is sin $\theta_F$; and of elements 49 and 50 is $$\frac{1}{\cos \theta_F}$$

These subdivided elements are chosen for convenience for use with the hybrid switching circuit involving switches 61 through 66 to be described subsequently.

In this first network, the input signal is buffered by the inverting feedback amplifiers 51 and 52. These amplifiers put out a signal which is 180 degrees out of phase with the input signal to provide a phase-shifted signal to switches 61 through 66. The output of these amplifiers is fed through summation devices 55 and 56 to amplifiers 57 and 58. These amplifiers phase-invert their respective inputs to produce a nonphase-shifted signal to switches 61 through 66. This phase inversion is carried out in a well-known manner with feedback circuits 59 and 60 completing a typical operational amplifier.

Switches 61 through 66 thus have available signals of varying polarity. These signals are switched to resolver network elements 43 through 50 having the transfer functions shown in FIG. 5. The outputs of elements 43 through 46 are summed with one input channel at 53 while elements 47 through 50 are summed at 54 with the other input channel. The feedback signals from these elements couple with the two components of the incoming vector so as to change the angle of the vector by four discrete amounts between zero degrees and 45 degrees. Although in this embodiment the resolver elements are resistors, it will be appreciated that these elements could be any devices having the prescribed transfer function. The insertion of certain combinations of these resistive elements in the feedback paths of their respective amplifiers selectively attenuates the two components of the incoming vector and effectively rotates it by discrete amounts. Since switches 61 through 66 are controlled by the count in the binary counter, this count determines the rotation imparted by the first network.

The transfer functions of these resistors are given generically in boxes 43 through 50 where X=5⅝ degrees and Y=16⅞ degrees. From these transfer functions, the required gains of each resistor can be computed and, given certain initial conditions, the exact resistance values can be obtained.

The following table gives the switching arrangement of switches 61 through 66 for rotating the incoming vectors by four discrete amounts:

TABLE 1

| Bits | | Angular rotation produced, degrees | Switch positions | | |
|---|---|---|---|---|---|
| 4 | 5 | | | | |
| 0 | 0 | 0 | $\bar{4}$ | $\bar{5}$ | J |
| 0 | 1 | 11¼ | $\bar{4}$ | 5 | $\bar{J}$ |
| 1 | 0 | 22½ | 4 | $\bar{5}$ | $\bar{J}$ |
| 1 | 1 | 33¾ | 4 | 5 | J |

In order to further rotate the input vector to zero degrees, a second discrete rotational network, shown in FIG. 6, is used. This second network is fed by amplifiers 51, 52, 57 and 58 of FIG. 5. The outputs of amplifiers 51 and 57 form one channel of the output of the feedback resolver network while the outputs of amplifiers 52 and 58 form the other channel. These two channels are gated to resistive elements 75 through 78, having transfer functions cos Z°, sin Z°, sin Z° and cos Z° by switches 71 through 74. Here, Z=22½°. Proper setting of these switches by the counter produces signal attenuations which effectively further rotate the input vector.

The last three bits in the aforementioned counter control switches 71 through 74 in the following manner to produce the indicated rotation:

TABLE 2

| Bits | | | Angular rotation produced, degrees | Switch positions |
|---|---|---|---|---|
| 1 | 2 | 3 | | |
| 0 | 0 | 0 | 0 | A and D. |
| 0 | 0 | 1 | 45 | E and H. |
| 0 | 1 | 0 | 90 | E and G. |
| 0 | 1 | 1 | 135 | A and C. |
| 1 | 0 | 0 | 180 | B and C. |
| 1 | 0 | 1 | 225 | F and G. |
| 1 | 1 | 0 | 270 | F and H. |
| 1 | 1 | 1 | 315 | B and D. |

By appropriate setting of switches 60 through 66 and 71 through 74, the incoming vector can be rotated by attenuating its components to within 11¼ degrees of zero degrees.

Switches 71 through 74 perform two functions: by choosing between the signals entering at 67, 70 or 68, 69 polarity of the incoming signals may be selected. By providing that signals 67, 68 or 69, 70 be switched between two sides of the network 75 through 78, two more types of voltages can be impressed across the network. This corresponds to the channel reversing described in connection with FIG. 2. It will further be appreciated that although the circuit configuration shown by elements 75 through 78 of FIG. 5 appears different from the configuration shown by elements 25 through 28 of FIG. 2, it is identical thereto when considered with the switch positions shown in Table 2.

Final rotations are carried out by the linear interpolator shown in FIG. 7. This interpolator is composed of two operational amplifiers 82 and 85 having feedback circuits 83 and 86, respectively. These feedback signals are summed at the inputs to these amplifiers at 81 and 84. The outputs of these amplifiers are fed to switches 87 through 94 which switch either polarity-inverted or noninverted signals from the hybrid network through resistive elements 95 through 102 into one arm of the resolver at 106. This effectively attenuates one component of the rotated vector from the hybrid resolver and adds it to the other until a null result is reached. The outputs of resistive elements 95 through 102 having a transfer functions $2^0$ through $2^7$ are summed at 104 along with a gain factor 103 having a transfer function of $2^8$ and multiplied by the tangent of 16⅞ degrees at 105. Thereafter, the resulting signal is added to the other component of the rotated vector at 106 to yield a composite rotated vector. It will be appreciated that this composite is made up of the altered components of the input vector and, therefore, represents its effective rotation. When this rotation creates a composite signal equal to zero degrees, the counter may be read out as the true shaft angle. If the angle falls in the third quadrant, there is a possibility that an angle 180 degrees removed from the true angle will be read out. In the above system, however, this state is unstable and can therefore be recognized.

The angular rotations carried out by switches 87 through 94 of the interpolation stage are summarized as follows:

| Bits 6-13 | Angular rotation produced | Switches closed |
|---|---|---|
| 00000000 | 0.00′ | $\bar{6}, \bar{7}, \bar{8}, \bar{9}, \overline{10}, \overline{11}, \overline{12}, \overline{13}$ |
| 00000001 | 2.56′ | $\bar{6}, \bar{7}, \bar{8}, \bar{9}, \overline{10}, \overline{11}, \overline{12}, 13$ |
| . | . | . |
| . | . | . |
| . | . | . |
| . | . | . |
| . | . | . |
| 11111111 | 11°57.04′ | 6, 7, 8, 9, 10, 11, 12, 13 |

The error output from summation 106 is buffered by operational amplifier 107 having feedback 108 and sent to the aforementioned analog-to-digital converter.

The above system has the advantage that its switches and circuits do not switch to ground to maximize the stability of the circuit. This reduces useless switching operations.

What is claimed is:

1. A digital resolver comprising:

a shaft;

means coupled to said shaft for generating a composite signal having a first pair of orthogonally oriented component vectors which uniquely define by their resultant vector the angular position of said shaft;

means for altering the magnitude of both of said component vectors by discrete amounts so as to produce a resultant vector which is rotated with respect to said first-mentioned resultant vector and which is defined by a second pair of orthogonal vectors;

means for altering the magnitude of said second pair of orthogonal vectors by different discrete amounts so as to produce a new resultant vector which is further rotated with respect to said first-mentioned resultant vector and which is defined by a third pair of orthogonal vectors;

means for altering the magnitude of one vector in said third pair by another discrete amount and for combining said altered vector with the unaltered vector of said third pair so as to produce an error signal which equals zero whenever the total amounts of rotation imparted to said first-mentioned resultant vector by said altering means is equal to the angular position of said shaft;

a counter for storing numbers in digital form, different portions of said counter being coupled to different altering means for selecting by what discrete amounts each of said means will alter its vectors; and means for changing the number in said counter until the amplitude of said error signal is reduced to zero, whereby the number in said counter which reduces said error signal to zero is the digital representation of the angular position of said shaft.

2. The digital resolver as recited in claim 1 wherein said third mentioned means includes a hybrid circuit comprising:

first, second, third and fourth resolving elements, said first and fourth resolving elements having a transfer function equal to cos θ, said second and third resolving elements having a transfer function equal to sin θ where θ is constant;

means for coupling the inputs of said first and second resolver elements to a predetermined portion of said input signal and for coupling the inputs of said third and fourth resolver elements to the remaining portion of said input signal; and means for coupling the output of said first resolver element with the output of said third resolver element and for coupling the output of said fourth resolver element with the output of said second resolver element.

3. The digital resolver as recited in claim 2 wherein said hybrid circuit includes:

means coupled to one of the portions of said counter and responsive to the digital state thereof for changing the polarity and crosscoupling of the signals appearing at the input of said hybrid circuit.

4. The digital resolver as recited in claim 3 wherein said first-mentioned means for altering is the feedback equivalent of said second-mentioned altering means.

5. The digital resolver as recited in claim 4 wherein said feedback equivalent is a circuit having resolving elements and including:

means coupled to a different portion of said counter and responsive to the digital state thereof for changing the polarity of the feedback signals impressed across said resolving elements.

6. The digital resolver as recited in claim 5 wherein said third-mentioned altering means rotates said second set of vectors by linear amounts.

7. The digital resolver as recited in claim 6 further including:

an actuator coupled to said shaft for positioning it in accordance with the magnitude of said error signal;

means for presetting said counter with a number corresponding to a predetermined angle; and means for inactivating said changing means and for coupling said error signal to said actuator, whereby the error signal produced by said resolver whenever the angle of said shaft is different from said predetermined angle causes said shaft to be rotated until the angle of said shaft corresponds to the angle represented by the number preset in said counter.

8. The digital resolver as recited in claim 6 wherein said means for changing the polarity and crosscoupling of the signals appearing at the input of said hybrid circuit includes:

switching means having four output terminals, four input terminals corresponding to each output terminal, and means at each output terminal for connecting it to one of its four corresponding input terminals, the first of said output terminals having input terminals $D_1$, $E_1$, $F_1$ and $C_1$;

the second of said output terminals having input terminals $B_2$, $H_2$, $A_2$ and $G_2$;

the third of said output terminals having input terminals $H_3$, $A_3$, $B_3$ and $G_3$; and the fourth of said output terminals having input terminals $F_4$, $D_4$, $C_4$ and $E_4$; and four input signals, the first of said input signals being coupled to input terminals $D_1$, $B_2$, $H_3$ and $F_4$;

the second of said input signals being coupled to input terminals $C_1$, $A_2$, $G_3$ and $E_4$;

the third of said input signals being coupled to input terminals $F_1$, $G_2$, $B_3$ and $E_4$; and the fourth of said input signals being coupled to input terminals $E_1$, $H_2$, $A_3$ and $D_4$;

said first and fourth signals being of the same polarity, said first and second signals being of opposite polarity, said first and third signals being of opposite polarity, and said second and third signals being of the same polarity, and said first output terminal being coupled to said first resolving element, said second output terminal being coupled to said third resolving element, said third output terminal being coupled to said second resolving element, and said fourth output terminal being coupled to said fourth resolving element, such that the amount of rotation imparted by said switching means and said resolving element combination to any vector appearing at the labeled inputs is given by the following table of connections whenever said output terminals are connected to those input terminals having the capital letters listed below:

| | |
|---|---|
| 0° | A, D |
| 45° | E, H |
| 90° | E, G |
| 135° | A, C |
| 180° | B, C |
| 225° | F, G |
| 270° | F, H |
| 315° | B, D |

9. The digital resolver as recited in claim 8 wherein said feedback equivalent is a circuit comprising:

first and second signal summation devices, each having a plurality of inputs and a single output;

first and second operational amplifiers coupled to the outputs of said first and second summation devices, respectively, each of said amplifiers having a resolver element in its feedback path with a transfer function $$\frac{\cos \theta_y + \cos \theta_x}{2}$$

third and fourth operation amplifiers coupled to the outputs of said first and second amplifiers, respectively;

second switching means having output terminals P, Q, R, S, T and U and input terminals $J_1$, $\overline{J}_1$, $K_2$, $\overline{K}_2$, $L_3$, $\overline{L}_3$, $L_4$, $\overline{L}_4$, $K_5$, $\overline{K}_5$, $J_6$ and $\overline{J}_6$;

means for selectively connecting terminal P to either terminal $J_1$ or $\overline{J}_1$;

means for selectively connecting terminal Q to either terminal $K_2$ or $\overline{K}_2$;

means for selectively connecting terminal R to either terminal $L_3$ or $\overline{L}_3$;

means for selectively connecting terminal S to either terminal $L_4$ or $\overline{L}_4$;

means for selectively connecting terminal T to either terminal $K_5$ or $\overline{K}_5$; and means for selectively connecting terminal U to either terminal $J_6$ or $\overline{J}_6$; and six additional resolver elements, the first of said resolver elements coupled to terminal P and having a transfer function equal to $$\frac{\cos \theta_x - \cos \theta_y}{2}$$

the second of said resolver elements coupled to terminal S and having a transfer function equal to $$\frac{\sin \theta_y + \sin \theta_x}{2}$$

the third of said resolver elements coupled to terminal T and having a transfer function equal to $$\frac{\sin \theta_y - \sin \theta_x}{2}$$

said first, second and third resolver elements being coupled to said first summation device;

the fourth of said resolver elements coupled to terminal Q and having a transfer function equal to $$\frac{\sin \theta_y - \sin \theta_x}{2}$$

the fifth of said resolver elements coupled to terminal R and having a transfer function equal to $$\frac{\sin \theta_y + \sin \theta_x}{2}$$

the sixth of said resolver elements coupled to terminal U and having a transfer function equal to $$\frac{\cos \theta_x - \cos \theta_y}{2}$$

said fourth, fifth and sixth resolver elements coupled to said second summation device;

terminals $J_1$, $K_2$ and $L_4$ being coupled to the output of said first amplifier;

terminals $\overline{J}_1$, $\overline{K}_2$ and $\overline{L}_3$ being coupled to the output of said first amplifier;

terminals $\overline{L}_4$, $\overline{K}_5$ and $J_6$ being coupled to the output of said second amplifier;

terminals $L_4$, $K_5$ and $\overline{J}_6$ being coupled to the output of said fourth amplifier, the outputs of said first, second, third and fourth amplifiers forming the four inputs to said hybrid circuit such that the amount of rotation imparted by said second switching means and resolving element combination is given by the following table whenever the output terminals of said second switching means are coupled to the input terminals of said second switching means having the symbols listed below:

| | |
|---|---|
| 0° | $\overline{L}, \overline{K}, J$ |
| 11¼° | $\overline{L}, K, \overline{J}$ |
| 22½° | $\overline{L}, \overline{K}, \overline{J}$ |
| 33¾° | $L, K, J$ |

References Cited

UNITED STATES PATENTS

| | | | |
|---|---|---|---|
| 3,480,946 | 11/1969 | Di Meo | 340—347 |
| 3,480,947 | 11/1969 | Naydan | 340—347 |
| 3,509,556 | 4/1970 | Schmidt | 340—347 |
| 3,512,151 | 5/1970 | Finkel et al. | 340—347 |

MAYNARD R. WILBUR, Primary Examiner

M. K. WOLENSKY, Assistant Examiner